(12) United States Patent
Beckmann et al.

(10) Patent No.: US 8,096,701 B2
(45) Date of Patent: Jan. 17, 2012

(54) METHOD AND APPARATUS FOR MIXING A GASEOUS FLUID WITH A LARGE GAS STREAM, ESPECIALLY FOR INTRODUCING A REDUCING AGENT INTO A FLUE GAS CONTAINING NITROGEN OXIDES

(75) Inventors: Gerd Beckmann, Gummersbach (DE); Wolfram Engelking, Wiehl (DE); Ulrich Priesmeier, Gummersbach (DE)

(73) Assignee: FISIA Babcock Environment GmbH (DE)

( * ) Notice: Subject to any disclaimer, the term of this patent is extended or adjusted under 35 U.S.C. 154(b) by 814 days.

(21) Appl. No.: 12/162,165

(22) PCT Filed: Jan. 26, 2007

(86) PCT No.: PCT/EP2007/000688
§ 371 (c)(1),
(2), (4) Date: Aug. 19, 2008

(87) PCT Pub. No.: WO2007/085471
PCT Pub. Date: Aug. 2, 2007

(65) Prior Publication Data
US 2009/0022008 A1    Jan. 22, 2009

(30) Foreign Application Priority Data
Jan. 28, 2006    (DE) .......................... 10 2006 004 069

(51) Int. Cl.
*B01F 5/04* (2006.01)
(52) U.S. Cl. ...................... 366/181.5; 366/336; 366/337
(58) Field of Classification Search ................ 366/181.5, 366/336, 337
See application file for complete search history.

(56) References Cited

U.S. PATENT DOCUMENTS

| | | | |
|---|---|---|---|
| 4,498,786 A * | 2/1985 | Ruscheweyh | 366/336 |
| 5,456,533 A * | 10/1995 | Streiff et al. | 366/173.1 |
| 6,135,629 A * | 10/2000 | Dohmann | 366/181.5 |
| 6,886,973 B2 * | 5/2005 | Phillips | 366/181.5 |
| 2002/0085448 A1 * | 7/2002 | Phillips | 366/181.5 |
| 2005/0189026 A1 | 9/2005 | Hansen | |
| 2006/0158961 A1 * | 7/2006 | Ruscheweyh et al. | 366/337 |

FOREIGN PATENT DOCUMENTS

| | | |
|---|---|---|
| DE | 37 23 618 | 12/1988 |
| DE | 92 07 635.1 | 8/1992 |
| DE | 198 06 265 | 7/1999 |

(Continued)

*Primary Examiner* — David Sorkin
(74) *Attorney, Agent, or Firm* — Robert Becker; Robert Becker & Assoc.

(57) ABSTRACT

A method and apparatus for mixing at least one gaseous fluid stream with a large gas stream flowing in a gas duct, especially for introducing a reducing agent into a flue gas containing nitrogen oxides. The gas stream is directed against at least one disk-shaped mixer element on an inlet side that is inclined at an angle counter to the direction of flow of the gas stream, wherein eddy-type whirls form at the mixer element. The gaseous fluid stream is guided essentially to the center of an impact surface associated with the discharge side of the mixer element and is admixed with a gas stream downstream of the mixer element and is guided essentially perpendicularly onto the center of the impact surface on the discharge side such that the gaseous fluid is distributed over the entire discharge side from the center thereof and is incorporated across the entire whirl system formed at the peripheral edge of the mixer element.

12 Claims, 3 Drawing Sheets

FOREIGN PATENT DOCUMENTS

| | | |
|---|---|---|
| EP | 0 637 726 | 2/1995 |
| EP | 0 956 895 | 11/1999 |
| EP | 1 166 831 | 3/2003 |
| EP | 1 107 821 | 6/2003 |
| EP | 1 568 410 | 8/2005 |
| EP | 1 604 742 | 12/2005 |
| GB | 683667 | 12/1952 |
| JP | 08084909 | 4/1996 |

* cited by examiner

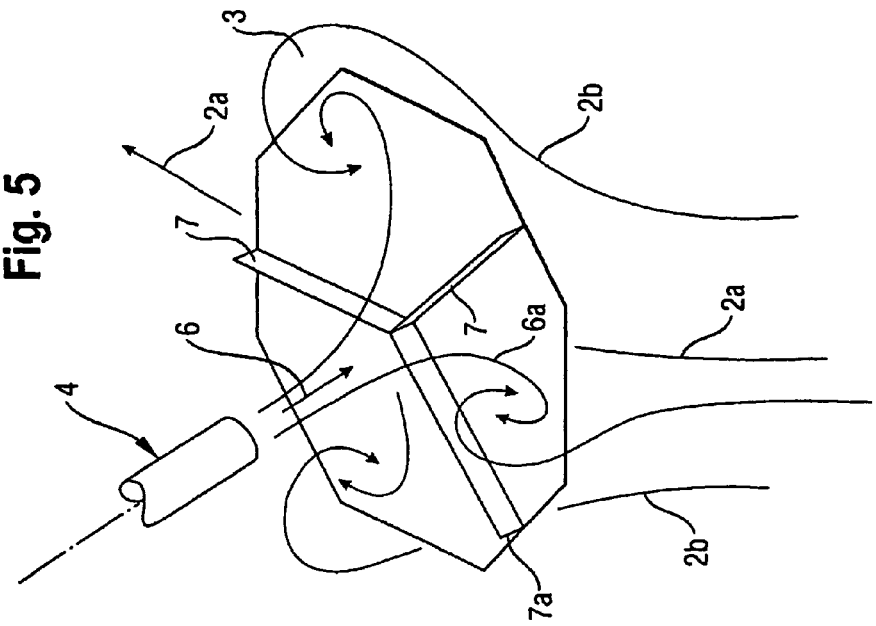
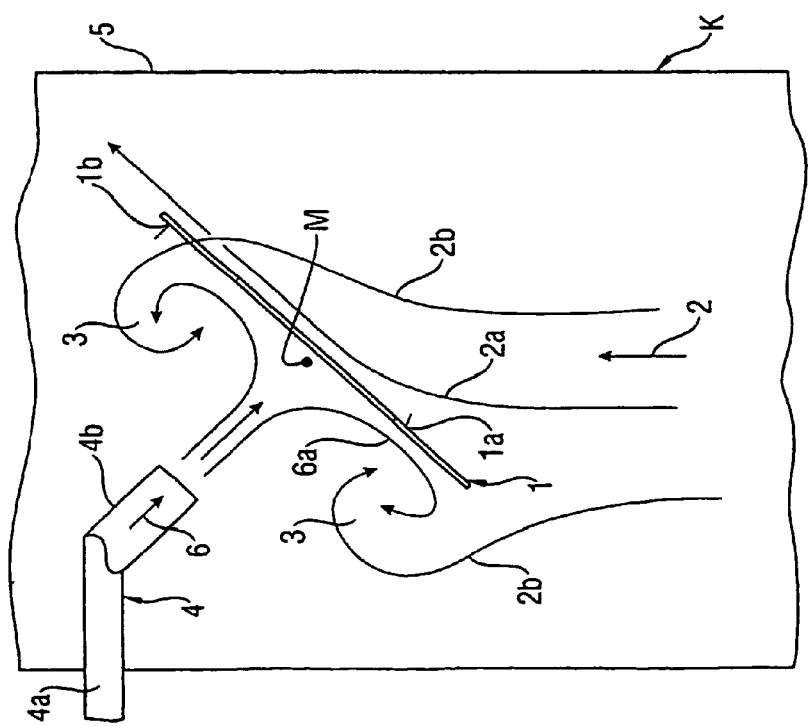

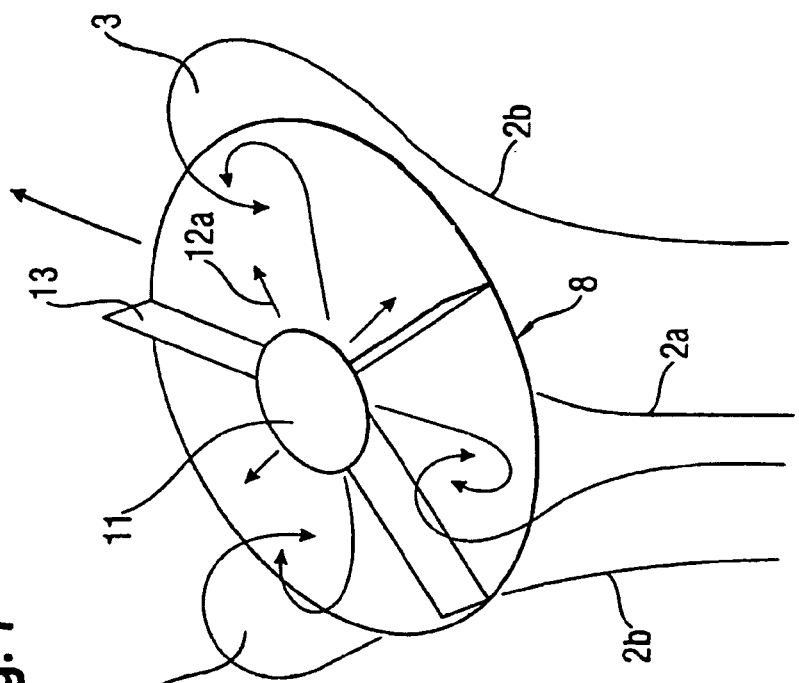
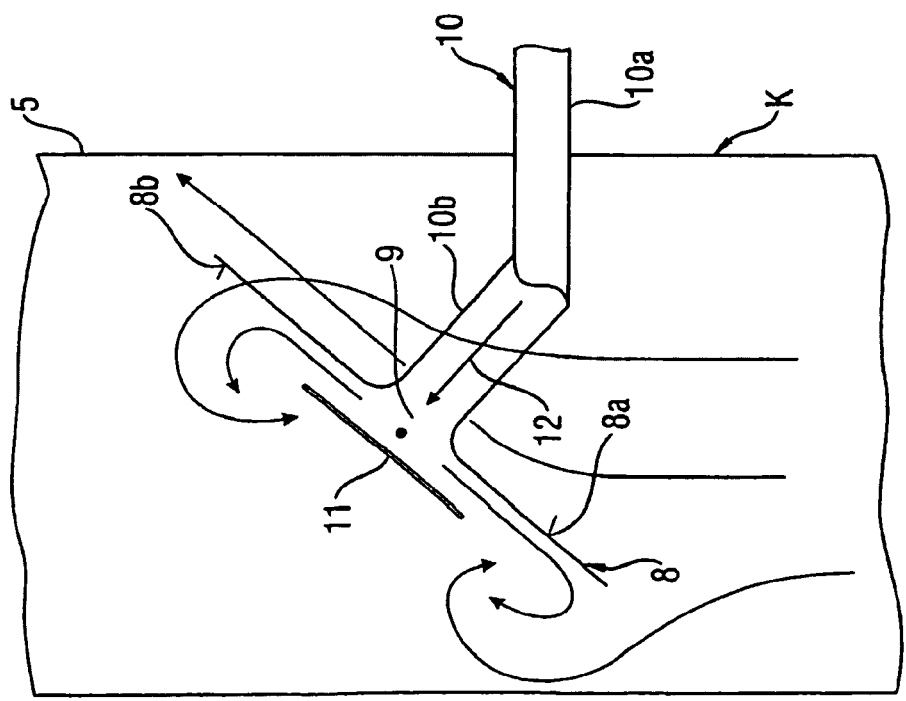

METHOD AND APPARATUS FOR MIXING A GASEOUS FLUID WITH A LARGE GAS STREAM, ESPECIALLY FOR INTRODUCING A REDUCING AGENT INTO A FLUE GAS CONTAINING NITROGEN OXIDES

BACKGROUND OF THE INVENTION

The instant application should be granted the priority dates of Jan. 28, 2006, the filing date of the corresponding German patent application 10 2006 004 069.4, as well as Jan. 26, 2007, the filing date of the International patent application PCT/EP2007/000688.

The present invention relates to a method of mixing at least one gaseous fluid stream with a large gas stream, especially for introducing a reducing agent into a flue gas that contains nitrogen oxides, whereby the large gas stream flows against at least one disk-like mixer element on an inlet side (windward side) thereof, wherein the mixer element is inclined at an angle counter to the direction of flow, and wherein eddy-type whirls form at the mixer element, further according to which the fluid stream is guided essentially to the center of an impact surface that is associated with the discharge side (lee side) of the mixer element, and according to which the gaseous fluid stream is admixed with the large gas stream.

EP 1 604 742 A1 discloses a method in conjunction with electric filters for the dust separation of large gas streams, according to which the flow whirl, which is formed at the inclined mixer disk, is designated as a leading edge whirl. The edge of the preferably circular disk that is directed against the large gas stream is designated as the intake edge, the other edge is designated as the breaking edge. These are not linear edges, but rather curved edges.

The vertical wall of the gas duct that guides the large gas stream has a short section of pipe for the admixture of a conditioning fluid pass perpendicularly therethrough. The short pipe section opens out, as viewed in the direction of flow of the large gas stream, behind the intake edge of the mixer disk without overlapping the mixer disk. The conditioning agent stream that exits the short pipe section strikes the edge-continuous partial surface of the discharge side of the mixer disk, adjacent to the section outlet, at an angle that corresponds to the angle of inclination of the disk relative to the direction of flow of the large gas stream. Column 6, lines 5-6, of EP 1 604 742 A1 indicates that methods are also expedient according to which the admixture device is mounted directly on the whirl apparatus.

EP 1 568 410 A1 discloses a method of the aforementioned general type for the admixture of fluid streams in conjunction with units for the reduction of the $NO_x$ level of a flue gas, according to which the reducing agent that is discharged from the short pipe section strikes the back side of the inclined mixer disk (lee side) close to its central region at an angle that corresponds to the angle of inclination of the disk relative to the direction of flow of the large gas stream. According to column 2, lines 17-20, the short pipe section should extend inwardly over only a short distance beyond the wall of the duct that guides the large gas stream (flue gas). Due to the inclined position of the short section relative to the mixer element, there is no uniform distribution of the gaseous fluid over the entire discharge side (lee side) and the gaseous fluid is not mixed into the flue gas stream over the entire peripheral edge of the mixer element, but rather essentially only over the upper edge portion in FIG. 1 of EP 1 568 410 A1.

With these procedures, there is thus no optimum distribution of the conditioning or reducing agent on the mixer disk, and there is thus no optimum mixing into the whirl system that results at the mixer disk.

With the mixing device described in EP 1 166 861 B1, in conjunction with Denox units and electric filters, the mixer disk (built-in surface) has a chamber into which leads a separate flow channel for the gas that is to be admixed or for another Newtonian fluid, and which serves as a distribution chamber for the gas stream. The chamber is provided on the back side (discharge side; lee side) of the mixer disk that faces away from the in-flow of the large gas stream with discharge openings, and is disposed in the region of the intake edge. Adjoining the distribution chamber toward the breaking edge are chambers that, however, have no distribution function nor a flow-related function, but rather serve exclusively for the reinforcement of the mixer disk. The discharge openings can be formed in the cover of the distribution chamber or in the side wall thereof. However, they can also be formed in an additional hood that is placed upon the chamber. It is furthermore possible that the chamber itself not be provided with a cover that is parallel to the mixer disk, but rather itself have a hood-shaped configuration. The flow channel for the supply of gas can enter into the chamber from the windward side of the mixer disk through the disk, or can be guided to the distribution chamber on the lee side of the mixer disk. With the method described in EP 1 166 861 B1 an additional chamber is required and the mixing-in is again effected only in the vicinity of the intake edge.

Such methods, designated as mixing methods having a static mixer, are, for example, also used with SCR units, to reduce the $NO_x$ level (Selective Catalytic Reduction) of flue gases, for example of power plant furnaces, by means of reducing agent and catalyzer. In this connection, it is customary, where the reducing agent is $NH_3$, that it is stored in the form of pressure-condensed $NH_3$ or of ammonium hydroxide ($NH_4OH$), and pre-vaporized $NH_3$ is sprayed into the flue gas stream via a carrier gas stream and is mixed with the flue gas stream. Where the reducing agent is urea, first an aqueous urea solution is produced that, after suitable processing, is then sprayed into the flue gas stream in gaseous form.

The methods are furthermore used, for example, for industrial chimneys, spray driers (see e.g. EP 0 637 726 B1), heat exchangers, flue desulfurization units, and hybrid cooling towers.

It is an object of the present invention, for methods of the aforementioned general type, to improve the mixing of the gaseous fluid stream into the large gas stream.

SUMMARY OF THE INVENTION

This object is realized in that the fluid stream is guided on the discharge side essentially perpendicular onto the center of the impact surface in such a way that the gaseous fluid is distributed over the entire discharge side of the mixer element from the center and is incorporated across the entire whirl system formed at the peripheral edge of the mixer element.

The gaseous fluid stream, from a supply conduit as an impact stream, strikes perpendicularly onto the center of the impact surface, where it produces a back-up point having static overpressure, proceeding from which the flow medium spreads out radially essentially parallel to the impact surface. This results in a rotationally symmetrical flat stream that on the lee side of the mixer element spreads out parallel to the surface of the disk up to the rim of the mixer element, and enters into the eddy-type whirl formed by the mixer disk that is disposed at an angle in the large gas stream.

As a consequence, the gaseous fluid is distributed over the entire discharge side of the mixer element and is incorporated into the entire whirl system formed at the peripheral edge of the disk.

In the case of a circular disk, the center is disposed in the center of the circle, and with a regular polygon is disposed in the center of gravity or centroid. If the mixer element deviates from the regular shape, such as with an unequally sided triangle, trapezoid or the like, an adaptation of the discharge position (nozzle position) is required in order none the less to achieve a largely uniform distribution of the gaseous fluid across the discharge side of the disk-shaped mixer element.

The gaseous fluid stream is preferably guided directly onto the discharge (lee side) of the mixer element, and hence the mixer element itself serves as the impact surface.

It can also be expedient to guide the gaseous fluid stream from the inlet side (windward side) through an opening provided in the mixer element onto an impact or deflection plate disposed on the discharge side (lee side) ahead of the opening.

An atomizer (so-called Air Blast Atomizer) is known from GB 683 667, according to which a liquid, including solutions, emulsions and suspensions, are to be atomized with the aid of an atomization gas stream. A stream of the liquid that is to be atomized strikes a non-rotating disk. A film that flows away to the periphery of the disk forms on the disk. The film enters into a zone that is protected relative to the atomization gas stream by a baffle disposed upstream of the disk and concentric thereto; the diameter of the baffle is 3 to 7 times greater than that of the distributor disk. Beyond this zone, i.e. at the peripheral break away edge of the baffle, the liquid that is to be atomized is picked up and taken along by the atomization gas stream. This reference does not address the formation of a particular flow whirl system at the baffle or at the disk. The drawings show that the liquid enters into the undisturbed laminar flow of the atomization gas. The method is to be used for the atomization of biocidic liquids, liquid fuels and liquid propellants.

A preliminary mixing gas burner is known from DE Gebrauchsmuster 92 07 635.1, according to which an impact plate disposed downstream of the discharge opening of a gas lance provides for a deflection and fanning of the initially still compact gas stream. The fanned gas stream enters into a laminar air stream.

A metering system is known from DE 198 06 265 C5 for the $NO_x$ level reduction of the exhaust gas of a diesel engine using a urea solution introduced into the exhaust gas ahead of a catalytic converter, whereby associated at a distance from the discharge opening of the urea solution into the exhaust gas chamber is an impact device that effects a change in direction of the urea solution that is sprayed into the exhaust gas chamber and has yet to be vaporized. The axis of the discharge opening forms an angle of approximately 45° with the main stream direction of the exhaust gas in the exhaust gas chamber, and the impact device is disposed perpendicular to this axis, i.e. the urea solution strikes the intake side (windward side) of the impact device. On the discharge side, a better supply of heat is achieved for the required vaporization. No additional, separate mixer element for producing a flow whirl is provided.

Known from Patent Abstract of Japan 0804909 A is an arrangement for the removal of HCl from the exhaust gas of a small combustion unit, according to which from a number of nozzles a plurality of streams of a wash liquid are directed at various angles onto the umbrella shaped surface of a baffle disposed with a vertical axis in the gas stream that is to be cleaned. The liquid, which runs off over the entire periphery of the circular baffle, forms a liquid curtain, through which the exhaust gas which is to be cleaned enters from below into the space above the baffle and out of which it flows off upwardly. There is no reference that particular flow whirls are deliberately formed in the arrangement.

The choice between the two aforementioned methods depends, for example, on the installation possibilities ahead of or behind the disk-like mixer element.

The present invention is also directed to an apparatus for mixing at least one gaseous fluid stream with a large gas stream that flows in a gas duct, especially for introducing a reducing agent into a flue gas that contains nitrogen oxides, with at least one disk-shaped mixer element that is held in the gas duct and has an inlet or windward side and a discharge or lee side, and that is disposed at an angle counter to the direction of flow of the gas stream, wherein eddy-type whirls form at the mixer element, with an impact surface associated with the center of the discharge side of the mixer element and parallel to the mixer disk, and with a tubular admixing device for the gaseous fluid stream directed essentially onto the center of the impact surface, especially for introducing a reducing agent into a flue gas that contains nitrogen oxides.

To improve the mixing process with this device, the discharge direction of the tubular admixing device is directed essentially perpendicularly onto the impact surface.

The fluid discharge of the admixing device is preferably disposed on the discharge (lee side) of the mixer element, and the mixer element itself serves as the impact plate, or the fluid discharge of the admixing device is an essentially central opening in the mixer element from which the fluid stream discharges toward the discharge side, and a separate impact plate is disposed on the discharge side at a distance ahead of the opening.

The mixer element preferably has a circular, elliptical, oval, parabola, diamond or triangular configuration, as is known from DE 37 23 618 C1, column 2, lines 40-45. A polygonal configuration, for example 8-cornered, is possible. Particularly preferred is the shape of a symmetrically structured 8-polygon, and further preferably a regular 8-polygon. A polygon in the form of a trapezoid is also particularly suitable.

The mixer disk is preferably inclined relative to the direction of flow of the gas stream at an angle in the range of between 30° to 90°.

The invention will be explained in greater detail subsequently by way of example and with the aid of the figures, in which:

BRIEF DESCRIPTION OF THE DRAWINGS

FIG. 4 is a side view/partial cross-sectional view comparable to FIG. 2 of a first embodiment of the inventive apparatus with an 8-cornered mixer disk, according to which the fluid stream is guided onto the discharge side (lee side) of the mixer disk, FIG. 5 is a perspective illustration of the apparatus of FIG. 4 with mounting supports of the mixer disk disposed on the discharge side, FIG. 6 is a side view/partial cross-sectional view comparable to FIG. 4 of a second embodiment of the inventive apparatus, according to which the fluid stream is supplied from the inlet side (windward side) through an opening in the mixer plate, and FIG. 7 is a perspective illustration of the apparatus of FIG. 6 with a view onto the discharge side of the mixer disk and the impact plate disposed there over the opening.

The formation of eddy trails or wakes involves a natural phenomenon in three-dimensional flows at a body (See Prandtl, Oswatitsch, Wieghardt; GUIDE THROUGH FLUID DYAMICS, 9$^{TH}$ Edition 1990; ISBN 3-528-28209-6, page 229, FIG. 4.41 and pertaining text).

DESCRIPTION OF SPECIFIC EMBODIMENTS

Figure 1:
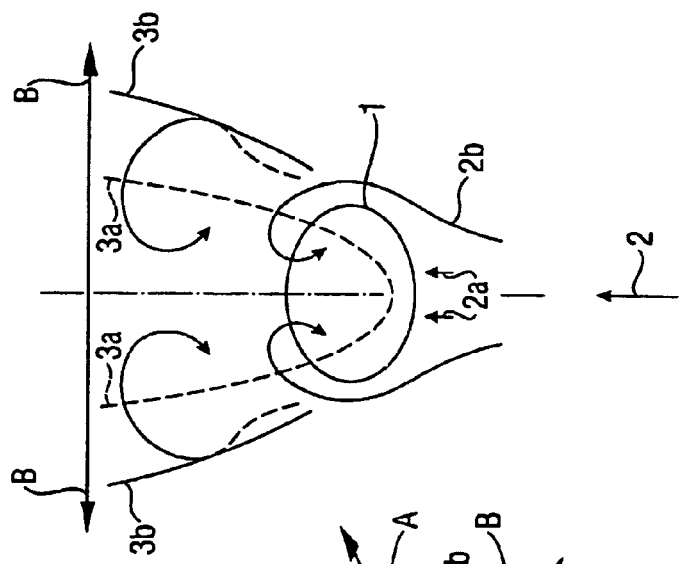
FIG. 1 shows a three-dimensional representation of a horseshoe eddy with eddy wake obtained at a circular disk against which a stream flows and that is inclined relative to the stream at an angle α.
Figure 2:
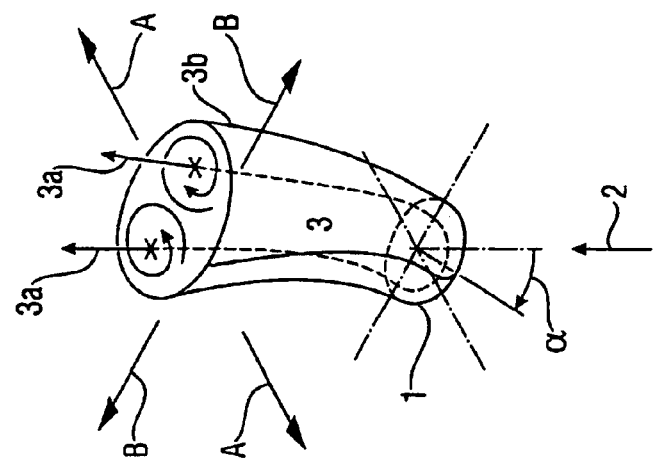
FIG. 2 is a side view transverse to the line A-A in FIG. 1.
Figure 3:
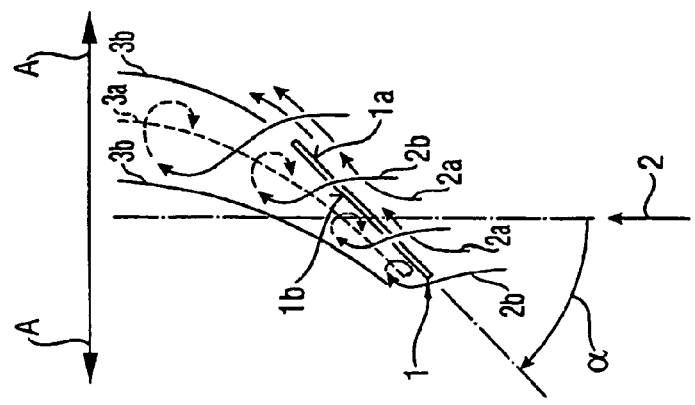
FIG. 3 is a front view onto the lee side of the disk transverse to the line B-B in the illustration of FIG. 1.

The formation, the shape and position of such eddy wakes in the downflow of mixer disks are first schematically illustrated in FIGS. 1-3 and will be described in conjunction therewith.

A circular disk 1 is inclined at an angle a relative to the flowing gas stream 2, which in FIG. 1 comes from below. On the windward or inlet side 1a of the disk, the gas stream is deflected from its main direction of flow, and there results a high-pressure zone. The partial stream 2a of the gas stream 2 flows at a prescribed angle along and below the disk. On the lee or discharge side 1b of the disk, a low-pressure zone forms that is filled beyond the edge of the disk by the partial stream 2a of the gas stream 2. Due to the flow deflection at the edge of the disk, there is formed a horseshoe eddy 3 having the eddy axis 3a, which is shown by a dashed line and that continues downstream of the disk in the form of an eddy wake having two symmetrically rotating eddies or whirls. The lateral eddies of the horseshoe eddy continue as wakes, overlap or superpose with the gas stream (principal stream), and expand with the principal stream. The flow condition within the eddy wake is very turbulent. The schematically illustrated boundary 3b of the horseshoe eddy and wake should not be seen as a sharply defined demarcation. The position and the structure of the two eddies as well as the opposite directions of rotation thereof, can be experimentally determined with suitable measuring techniques.

Comparable eddies having wakes are formed with other disk shapes, such as elliptical, oval, parabola, diamond, polygonal or triangular shapes.

The turbulent intermixing of eddy wakes and gas stream is utilized to distribute a gas stream that is metered-in in a nearly point-type manner over a very large cross-sectional area.

With the embodiment of the inventive apparatus shown in FIGS. 4 and 5, a supply conduit 4 extends via a linear section 4a through the wall 5 of a duct K that guides the large gas stream 2 and in which a regular 8-cornered mixer disk 1 is disposed at an angle. (The 8-corner shape is preferred). Adjoining the conduit section 4a is an angled-off conduit section 4b that is oriented perpendicular to the center M of the lee or discharge side 1b of the mixer disk 1.

The strong gaseous fluid stream or jet 6 that exits the conduit section 4b strikes the mixer disk having the center M as a back-up point, and is distributed over the discharge side 1b of the mixer disk 1, as schematically illustrated by the arrows 6a in FIG. 5. The incorporation or blending into the flow whirl or wake 3 occurs in the region of the peripheral edge.

Illustrated in FIG. 5 are three mounting supports 7, which respectively in pairs form on angle of 120°, and are secured to the discharge side of the disk 1; the mounting supports extend to the center M, and their free ends 7a are connected with the wall of the duct or with a non-illustrated supporting framework. The mounting supports 7 can extend up to the wall of the duct, where they can be welded. Since the mounting supports extend radially, they do not obstruct the flow in the direction of the arrows 6, but rather aid the radial orientation of the flow.

With the embodiment of the inventive apparatus shown In FIGS. 6 and 7, a circular mixer disk 8 having a central opening 9 is provided. A supply conduit 10 extends via a linear section 10a through the wall 5 of the duct K, which guides the large gas stream 2. Adjoining the conduit section 10a is an angled-off conduit section 10b, which on the windward or inlet side 8a of the mixer disk 8 is oriented perpendicular to the opening 9 and is welded to the disk.

An impact or deflection plate 11 is disposed on the lee or discharge side and is spaced from and is over the opening 9. The fluid stream 12, which is deflected at the impact plate, is distributed over the discharge side as schematically illustrated by the arrows 12a in FIG. 7. The incorporation or blending into the flow whirl or wake 3 occurs in the region of the peripheral edge.

Since the mounting supports 13 that are provided also extend radially, they do not obstruct the flow in the direction of the arrows 12.

The conduits 4 and 10 need not necessarily be angled-off in the duct K; the gaseous fluid need only be supplied to the mixer disk in a perpendicular manner, i.e. an inclined guiding of the conduit through the duct wall 5 would also be conceivable. It is furthermore conceivable for at least one further conduit section to extend parallel to the wall of the duct.

Other radial mounting support configurations having more or fewer than three mounting supports can also be utilized.

It is to be understood that with large duct cross sections a plurality of mixer disks having fluid supply associated therewith can be distributed over the cross-section of the duct and can be staggered in one or more planes.

The specification incorporates by reference the disclosure of German 10 2006 004 069.4 filed Jan. 28. 2006, as well as International application PCT/EP2007/000688, filed Jan. 26 2007.

The present invention is, of course, in no way restricted to the specific disclosure of the specification and drawings, but also encompasses any modifications within the scope of the appended claims.

REFERENCE NUMERAL LIST 1 round mixer disk
1a windward side of the disk
1b lee side of the disk
2 Gas stream
2a gas stream, partial stream on the windward side 1a of the disk
2b gas stream, partial stream toward the lee side 1b of the disk
3 horseshoe eddy and wake
3a eddy axis
3b outer boundary of the eddy
4 supply conduit
4a linear conduit section
4b angled-off conduit section
5 wall of the flue gas duct K
6 strong fluid stream or jet
6a arrows of the fluid stream
7 mounting supports
7a free ends of the mounting supports
8 angular mixer disk
8a windward side
8b lee side
9 central opening 10 supply conduit
10a linear conduit section
10b angled-off conduit section
11 impact or deflection plate
12 fluid stream
12a arrows of the fluid stream
13 mounting supports
K flue gas duct
M center of the disks 1, 8 or back-up point of the impact stream

The invention claimed is:

1. A method of mixing at least one gaseous fluid stream with a large gas stream, including the steps of:
   directing the large gas stream against at least one disk-shaped mixer element on an inlet or windward side thereof, wherein said at least one mixer element is inclined at an angle counter to the direction of flow of the large gas stream, and wherein eddy-type whirls are adapted to form at said at least one mixer element; and
   guiding the gaseous fluid stream essentially to the center of an impact surface associated with a discharge or lee side of said at least one disk-shaped mixer element, wherein the gaseous fluid stream is admixed with the large gas stream downstream of said at least one mixer element, and wherein the gaseous fluid stream is guided essentially perpendicularly onto the center of the impact surface on the discharge side of said at least one mixer element such that the gaseous fluid is distributed over the entire discharge side of the at least one mixer element from the center thereof and is incorporated across the entire whirl system formed at a peripheral edge of said at least one mixer element.

2. A method according to claim 1, wherein said gaseous fluid stream is guided directly onto the discharge side of said at least one mixer element.

3. A method according to claim 1, wherein the gaseous fluid stream is guided from the discharge side of said at least one mixer element through an opening provided in said at least one mixer element and onto an impact plate disposed on the discharge side in front of the opening.

4. An apparatus for mixing at least one gaseous fluid stream with a large gas stream that is adapted to flow in a gas duct, comprising:
   at least one disk-shaped mixer element disposed in the gas duct and having an inlet or windward side and a discharge or lee side, wherein said at least one mixer element is disposed at an angle counter to the direction of flow of the large gas stream, and wherein eddy-type whirls are adapted to form at said at least one mixer element:
   an impact surface associated with a center of said discharge side of said at least one mixer element, wherein said impact surface is parallel to said at least one mixer element; and
   a tubular admixing device for said gaseous fluid stream, wherein said admixing device is directed essentially onto a center of said impact surface, and wherein a discharge direction of said tubular admixing device is directed essentially perpendicularly onto said impact surface.

5. An apparatus according to claim 4, wherein said tubular admixing device is adapted to introduce gaseous fluid stream in the form of a reducing agent Into a flue gas that contains nitrogen oxides.

6. An apparatus according to claim 4, wherein a fluid discharge of said admixing device is disposed on the discharge side of said at least one disk-shaped mixer element, and wherein said at least one mixer element serves as an impact plate that is provided with said impact surface.

7. An apparatus according to claim 4, wherein a fluid discharge of said admixing device is an essentially centrally disposed opening in said at least one disk-shaped mixer element through which said gaseous fluid stream is adapted to be discharged toward the discharge side, and wherein a separate impact plate is disposed on the discharge side ahead of said opening and at a distance therefrom.

8. An apparatus according to claim 4, wherein said at least one disk-shaped mixer element has a circular, elliptical, oval, parabola, diamond, polygonal, or triangular shape.

9. An apparatus according to claim 8, wherein said at least one disk-shaped mixer element has a polygonal shape in the form of a symmetrical structured 8-cornered shape or a trapezoidal shape.

10. An apparatus according to claim 9, wherein said 8-cornered shape is a regular 8-cornered shape.

11. An apparatus according to claim 4, wherein said at least one disk-shaped mixer element is inclined relative to the direction of flow of said large gas stream at an angle that is in the range of between 30° to 90°.

12. An apparatus according to claim 4, wherein radially extending mounting supports for holding said at least one disk-shaped mixer element in the gas duct are disposed on the discharge side of said at least one disk-shaped mixer element.

* * * * *